July 7, 1931.  O. WITTEL  1,813,691
DIAPHRAGMING FILTER ATTACHMENT FOR CAMERAS
Filed Oct. 24, 1929
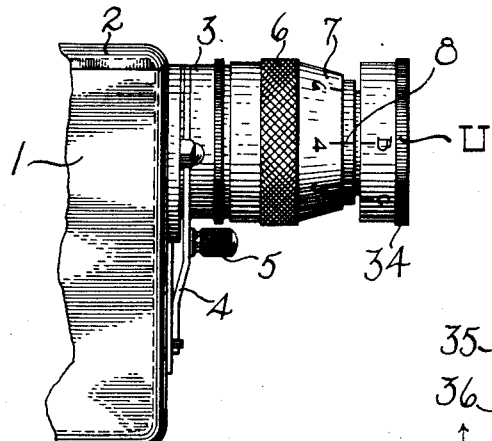
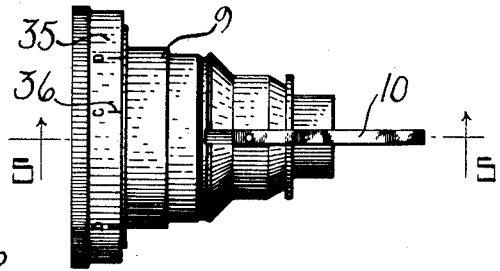
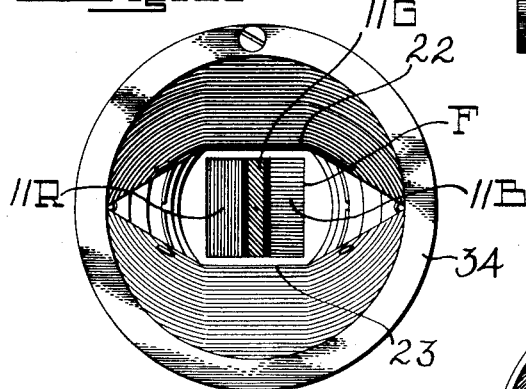
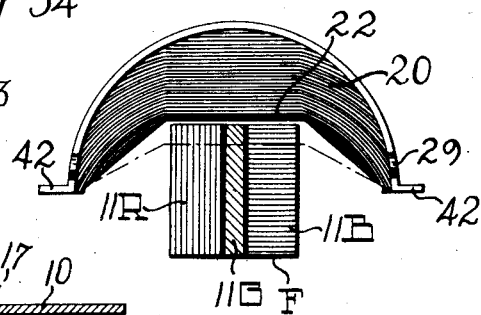
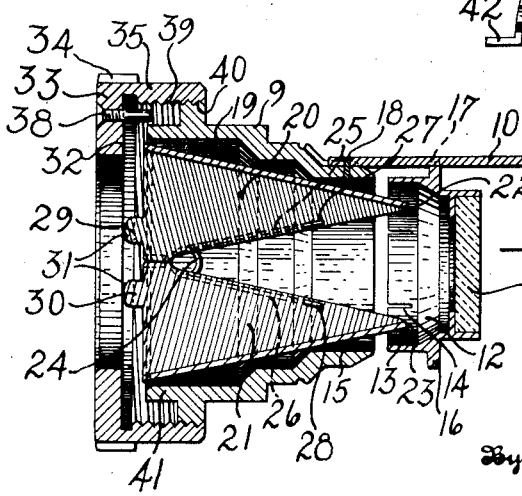
Inventor
Otto Wittel Patented July 7, 1931

1,813,691

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

DIAPHRAGMING FILTER ATTACHMENT FOR CAMERAS

Application filed October 24, 1929. Serial No. 402,130.

This invention relates to photography, and more particularly to light reducing or diaphragming means for photographic objectives. One object of my invention is to provide a light adjusting means which is attachable to objectives of standard types of motion picture equipment. Another object of my invention is to provide a simple unit, including a color filter and a light adjusting means, which can be attached to a standard camera to equip it for color photography. Another object of my invention is to provide a simple unit of the type described which can easily be placed on a camera and can be readily adjusted when in this position. Other objects will appear from the following specifications, the novel features being particularly pointed out in the claims at the end thereof.

Coming now to the drawings wherein like reference characters denote like parts throughout, Figure 1 is a top plan view of a portion of a standard motion picture camera equipped with a light adjusting unit constructed in accordance with and embodying a preferred form of my invention.

Figure 2 is a side elevation of the unit removed from a camera.

Figure 3 is an enlarged front view of the unit shown in Figure 2.

Figure 4 is a fragmentary detailed view showing one of the adjusting plates removed from its mount.

Figure 5 is a section on line 5—5 of Figure 2.

In certain systems of color photography, a color filter is used, and this color filter may be in the form of a series of colored filter bands. A preferred type of such filter may consist of three parallel bands of red, green and blue. Obviously if the usual diaphragming mechanism of the photographic objective is used, more of some colors will be cut out than of others if the lens is stopped down, since the ordinary diaphragm used in photographic objectives makes a circular opening. With a light adjusting mechanism constructed in accordance with my invention, the proportion of the colors of the different filter bands will remain the same even though the total amount of light admitted through them will be varied.

As indicated in Figure 1, my invention designated broadly as U may be mounted on a standard camera 1 in the following manner. The camera 1 may be provided with the usual removable side 2 and the objective mount 3. In the present instance this objective mount 3 is shown as being provided with a lever 4 operable by handle 5 for adjusting the standard type of my diaphragm which makes a circular opening inside of the lens element. The lens mount is also provided with a knurled ring for adjusting the annular member 6 which carries a focusing scale 7. The objective is focused by turning this ring until one of the graduations on the scale 7 comes opposite a pointer 8.

For further details of the lens barrel and attachments reference can be had to my Patent 1,688,370 for lens attachment for photographic apparatus issued October 23, 1928, wherein the construction of these parts is fully described and illustrated.

The present attachment is somewhat similar to the attachment shown in the above-mentioned patent in Figure 3. In the present instance the attachment consists of a support 9 which is preferably annular in shape and is provided with a rearwardly extending arm 10 adapted to engage parts of an objective mount as described in the above-mentioned patent. This arm serves to locate the support on the objective mount in a pre-determined position so that the color filter bands which are shown in Figure 3 as 11—G, 11—R and 11—B may be properly located with respect to the film.

In the present instance the filter, which may be designated broadly as F, and which is constructed of the banded color filter elements above described, may be carried in an annular member 12, best shown in Figure 5. This annular member is provided with an inwardly projecting flange 13 which is slotted at 14 so that it will have a spring fit with the inside 15 of the end of the support 9. A second flange 16 on the annular member 13 is notched at 17 so as to engage the arm 10 and thus be located by this arm, since this arm is affixed by rivets 18 or otherwise to the annular member 9. This construction permits the attachment 13 to be placed on the support 9 in only one position.

There is an annular bore, or opening, 19 in the support 9 and this may consist of a series of different diameter openings, as may be found convenient for the particular objective used. A pair of adjustable plates 20 and 21 are preferably hingedly mounted upon pintles 42 inside of the annular bore 19. These plates are elongated in shape and having edges 22 and 23 which lie close to the substantially rectangular opening of the filter F. On each side of the support there is a hairpin spring 24 having ends 25 and 26 normally thrusting outwardly on the plates through engagement with the lugs 27 and 28 as will appear from Figure 5.

These springs normally hold the plates apart in the position shown in Figure 3 so that they do not in any way restrict the light entering through the rectangular opening of the filter. If, however, it is desired to reduce the amount of light passing through the objective, these plates may be pressed against the pressure of the springs in the following manner.

The plates 20 and 21 are provided with rearwardly extending lugs 29 and 30. These lugs preferably have rounded outer edges as indicated at 31 and these edges normally contact with the inner surface 32 of a ring 33. Ring 33 is knurled at 34 and this ring is provided with a flat surface 35 on which a scale 36, as best shown in Figure 2, is engraved.

The scale 36 may be graduated into any desired units, either units which indicate the proportion of the light admitted to the filter F, or the units may be entirely arbitrary. Like the focusing scale 7, the graduations 36 may be adjusted when the support is mounted on an objective by bringing the desired unit opposite a pointer line 8. Thus both the focusing scale and the scale indicating the opening to the filter F are adjusted to a single mark.

From Figure 5 it will be noted that the ring 33 is provided with an inwardly extending pin 38. This pin is adapted to contact with a pin carried by the flange 41 (not shown) to limit the rotation of the ring 32 so that it cannot be unscrewed from the support 9. The flange 35 has a female thread 39 which is adapted to engage the male thread 40 of the support 9. By turning the knurling 34 to rotate the ring 33, the lugs 29 and 30 of the adjustable plates are forced inwardly, thus causes the edges 22 and 23 to reduce the size of the rectangular opening.

It should, however, be noted that the edges 22 and 23 are substantially parallel to two sides of the rectangular opening and as these plates move towards each other, they reduce the color filter bands 11—G, 11—R and 11—B by a like amount so that the proportion of these color filter bands is not altered as the size of the opening is altered.

The operation of this device is very simple. With a camera 1 black and white pictures can be taken in the normal way. If, however, it is desired to take color photographs, the support 9 is placed on the objective barrel 3 and the part including the filter bands will be automatically positioned in the proper location with respect to the camera. By turning the knurled ring 34, the amount of light admitted through the filter can be readily adjusted from the outside of the camera and the proportion of the various color filters will not be altered.

The color process for which this structure is particularly intended is one utilizing film with a lenticulated surface and this invention may be considered as a specific embodiment of the invention generically covered in the patent to Seymour, No. 1,689,258, granted October 30, 1928.

Having thus described my invention, what I claim as new and desire to secure by Letters Patent is:

1. In a light reducing device for photography, the combination with an attachment for objectives having a light opening therein, a pair of elongated hinged plates curved in cross section having one end near the light opening, and the other end hinged to the attachment and having edges projecting therefrom, a member movably mounted on the attachment engaging the edge projecting from the plate to move the plates for altering the aperture.

2. In a light reducing attachment for photography, the combination with an attachment adapted to be seated on an objective and having an opening therein, of a ring axially movable on the attachment, elongated movable plates curved in cross section carried by the attachment and adjustable by the ring to vary the size of the opening.

3. In a light reducing attachment for photography, the combination with an attachment adapted to be seated on an objective and having an opening therein, a color filter mounted in the opening having color areas of suitable relation, elongated plates curved in cross section movably mounted in the attachment, said plates being positioned so that one end thereof may move across the opening of the annular member to alter the color areas of the filter proportionally, and a ring mounted on the attachment to move axially thereof for contacting with and adjusting the movably mounted plates.

4. In a light reducing attachment for photography, an attachment adapted to be seated on an objective and having a light opening therein of substantially rectangular shape, a color filter comprising differently colored bands extending across the rectangular opening, an elongated hinged plate mounted in the attachment and having an edge substantially parallel to one side of the rectangular opening, and means carried by the attachment for moving the plate transversely of the filter color bands.

5. In a light reducing attachment for photography, an attachment adapted to be seated on an objective and having a light opening therein of substantially rectangular shape, a color filter comprising differently colored bands extending across the rectangular opening, a pair of elongated hinged plates having edges substantially parallel to two sides of the rectangular opening, and a threaded ring movable on the attachment and contacting with the plates for moving the plates to reduce the area of the color filter bands proportionately.

6. In a light reducing attachment for photography, the combination with an attachment having a locating device adapted to position it on a camera objective, of a color filter carried by the attachment including a plurality of color filter areas arranged in a suitable pattern, means including an elongated plate movably mounted inside of the attachment and having one edge of suitable shape for altering the color areas proportionately, and a ring having threaded connection with the attachment for moving the movable plate, said ring bearing a scale visible outside of the attachment adapted to indicate the setting of the plate.

7. In a light reducing attachment for photography, the combination with an attachment adapted to engage a lens barrel and having an opening therein, of a pair of hinged plates normally spring pressed away from the opening, and means for moving the plates against the spring pressure toward the opening.

8. In a light reducing attachment for photography, the combination with an attachment adapted to engage a lens barrel and having an opening therein, of a pair of elongated plates hingedly attached to the opening, springs encircling the hinge pintles adapted to separate the plates, a threaded ring carried by the attachment adapted to thrust the plates together.

9. In a light reducing attachment for photography the combination with an attachment having an annular opening therein, an elongated curved plate having one edge lying near the opening, a pivotal support for the opposite edge of the plate, a spring normally thrusting an edge of said plate near said pivotal support into contact with a ring, said ring being threaded to said support for adjusting the plate.

Signed at Rochester, New York, this 21st day of October, 1929.

OTTO WITTEL.